Dec. 8, 1964  J. R. DOWNING ETAL  3,160,879
OBJECT LOCATING SYSTEM
Filed July 17, 1961  4 Sheets-Sheet 1
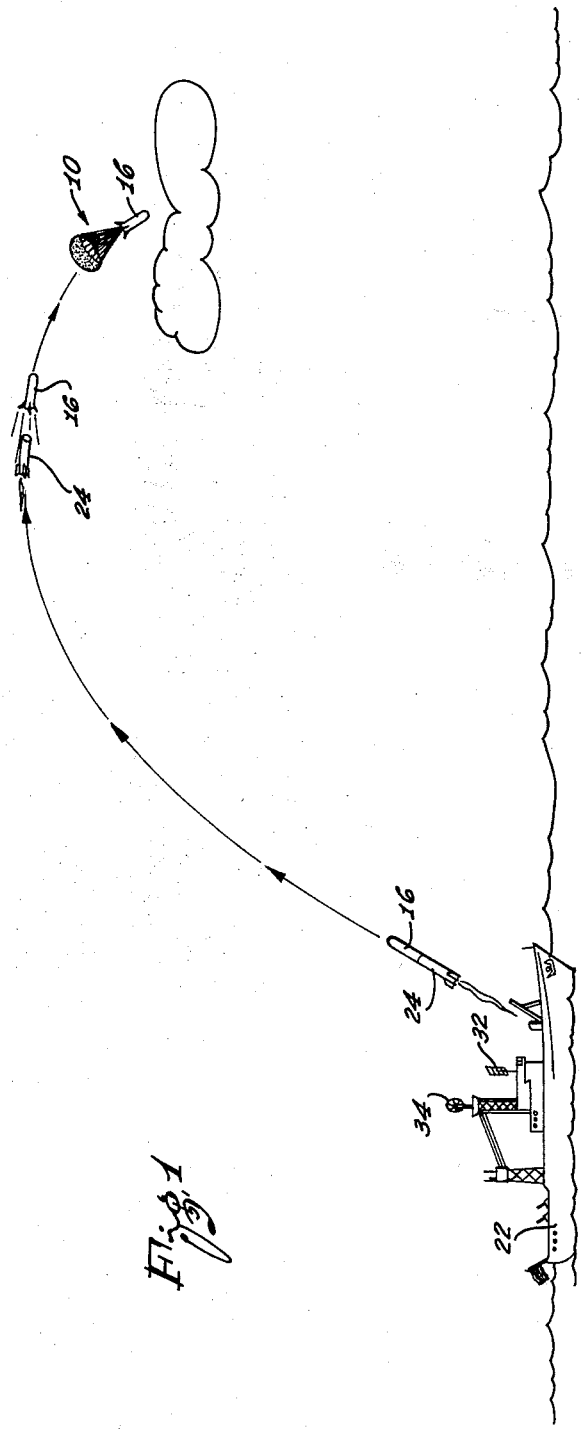
INVENTORS:
J. Robert Downing
John H. McClow, Jr.
By Keith D Beecher
Attorney

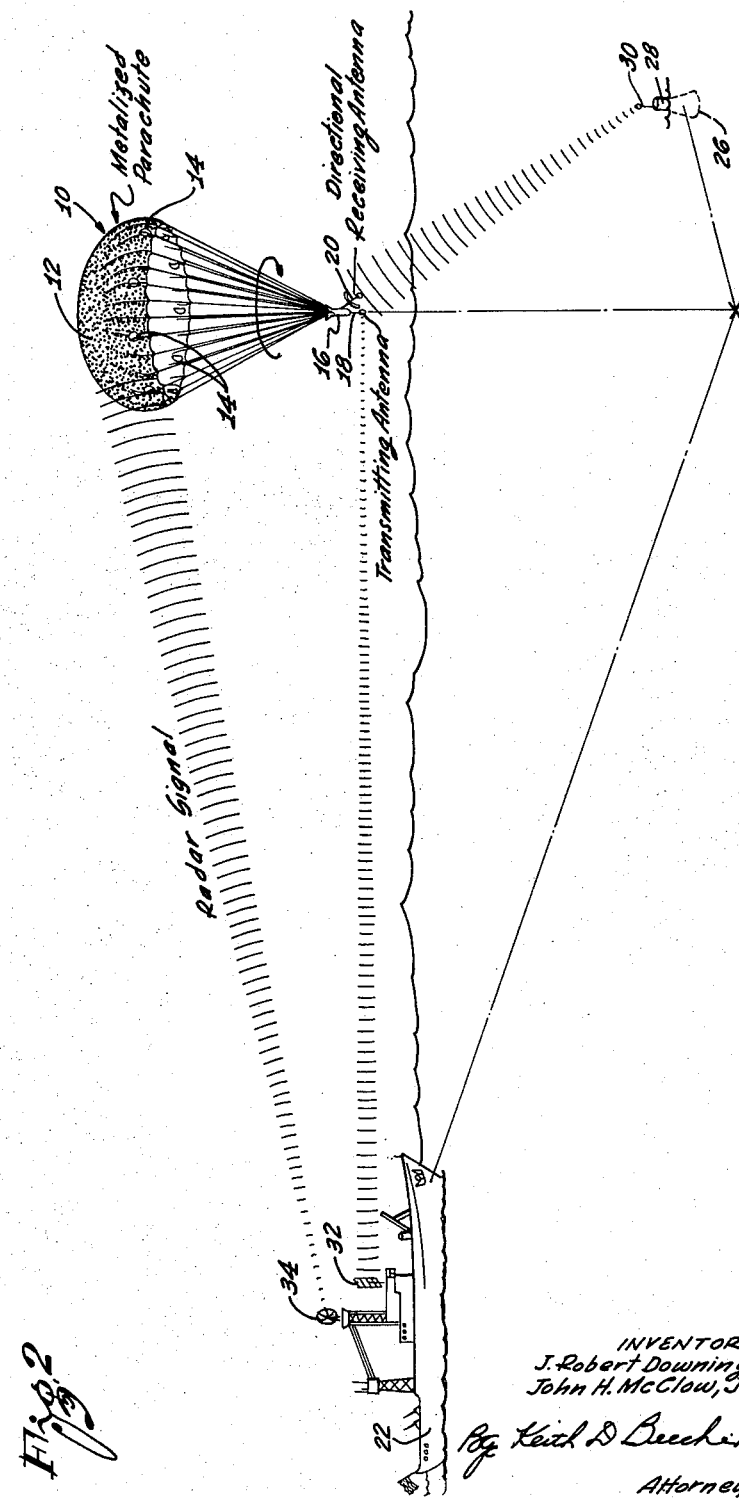

Dec. 8, 1964

J. R. DOWNING ET AL 3,160,879

OBJECT LOCATING SYSTEM

Filed July 17, 1961

INVENTORS:
J. Robert Downing
John H. McClow, Jr.

By Keith D. Beecher
Attorney

Dec. 8, 1964   J. R. DOWNING ETAL   3,160,879
OBJECT LOCATING SYSTEM
Filed July 17, 1961   4 Sheets-Sheet 4
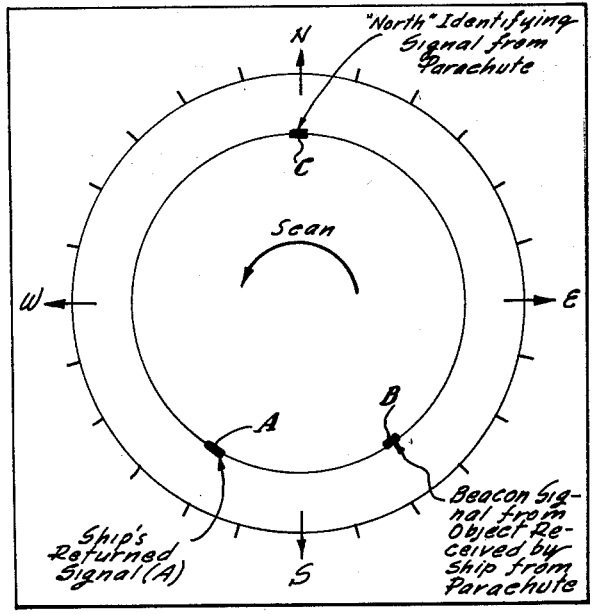
Fig. 4 (Display)
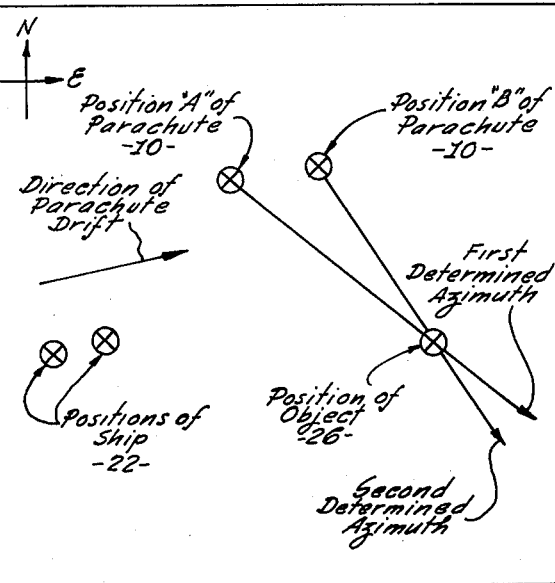
Fig. 5
INVENTORS:
J. Robert Downing
John H. McClow, Jr
By Keith D. Beecher
Attorney

United States Patent Office 3,160,879
Patented Dec. 8, 1964

3,160,879
OBJECT LOCATING SYSTEM
James Robert Downing, Jackson Heights, N.Y., and John H. McClow, Jr., Torrance, Calif., assignors, by mesne assignments, to Itek Corporation, Lexington, Mass., a corporation of Delaware
Filed July 17, 1961, Ser. No. 124,400
10 Claims. (Cl. 343—6)

The invention relates to object locating systems, and it relates more particularly to a system for specifically fixing the position of an object to be located.

The system of the invention is intended to fill a growing need for a simple, effective, relatively inexpensive and integrated means for searching and locating floating objects and pilots downed at sea.

Many space vehicles are designed so that at least a portion of the original vehicle, such as the nose cone or capsule, is returned to earth intact. This portion of the vehicle usually contains valuable recorded data and equipment, and it usually must be recovered if the mission is to be a success. Difficulties have been encountered in the past in locating such portions of space vehicles which have been fired into space, and many have been lost.

It is an object of the present invention to provide an improved system which permits a surface vessel, such as a ship, to obtain information as to the actual position of an object such as the returned portion of a space vehicle, and to achieve this position fix in a relatively straightforward and simple manner and by the use of relatively uncomplicated instrumentalities.

The present invention is also useful, as mentioned above, for locating downed airmen. In this latter case, the invention enables rescue to be made by a small craft, and so obviates the need for undue exposure of the larger ships, such as the aircraft carriers.

The invention in one embodiment comprises essentially a ship-launched rocket vehicle which, on attaining working altitude and range, releases a balloon-borne or parachute-borne radio repeater station, or transponder. An important advantage of such an airborne unit is that the line-of-sight between transmitter and receiver is increased, and this results in a correspondingly increased transmission range.

The system of the invention utilizes in effect a radio repeater or transponder station which may be launched from the searching surface craft; and which is airborne during the search interval by means, for example, of a balloon or parachute, so as to avoid the need for an aircraft. The repeater station is launched in the vicinity of the object to be located, for example, within an area extending up to approximately 150 miles from the object. The repeater station then serves to receive the radio signals from a beacon transmitter which is mounted in the object to be located, and to relay these signals in a particular manner to the searching surface vessel. In the case of downed airmen, the beacon transmitter would be part of the standard survival gear.

A further object of the invention, therefore, is to provide an improved object locating system for operation in conjunction with a beacon transmitter mounted in the object to be located, the object locating system of the invention serving effectively and materially to increase the range of such beacon transmitter.

A further object of the invention is to provide such an improved object locating system in which not only is the range of the beacon transmitter in the object to be located effectively increased, but which utilizes signals from the object and from the searching vessel to provide information relative to the actual absolute position of the object, rather than information relating merely to the direction of the object from a particular reference.

The system of the invention is eminently simple in that it incorporates well known and reliable equipment and component parts. The system is effective in that it contains an automatic "report back" function which determines whether or not the equipment is working properly and effectively. Moreover, the system of the invention is relatively inexpensive in its construction, servicing and operation.

The system of the invention is also advantageous in that it provides an integrated system. This integration is realized because the tasks of search, location and retrieval can be conducted by ship alone in the practice of the invention; and without aircraft, external communication, or other external aids.

The features of the invention which are believed to be new are set forth in the attached claims. The invention itself, however, together with further objects and advantages thereof, may best be understood by reference to the following description when taken in conjunction with the accompanying drawings, in which:

FIGURE 1 is a pictorial representation of a searching vessel and illustrates schematically one example of the manner in which certain components of the system of the invention may be launched from the vessel and subsequently deployed;

FIGURE 2 is a pictorial representation illustrating one example of the manner in which the system of the present invention functions to cause signals received by the airborne components of the system to be relayed to the searching vessel, so as to permit an actual fix to be made on the object to be located, as will be described;

FIGURE 4 is a schematic representation of an appropriate cathode-ray oscilloscope display device for use in the searching vessel and which provides an azimuth indication of the object to be located; and FIGURE 5 is a schematic representaion of a plotting board illustrating the manner in which the absolute position of the object to be located may be established.

Figure 3A:
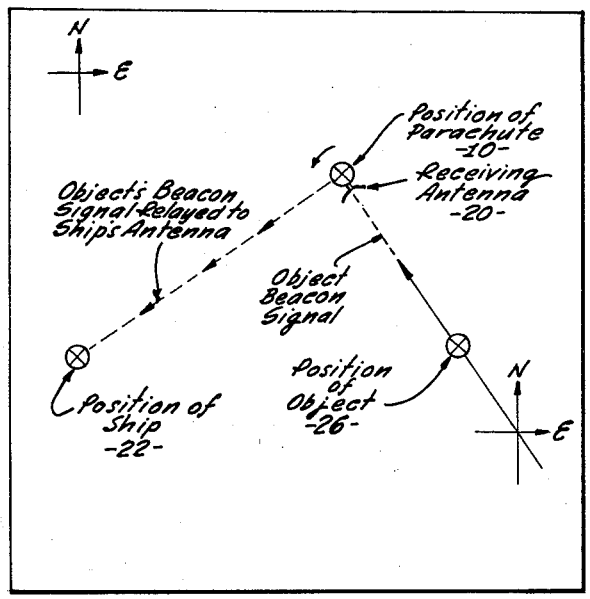
FIGURES 3A and 3B are schematic representations illustrating the manner in which signals are transmitted and received between the different components of the system of the invention.

The capability of surface ships normally to detect the radio signals from beacon equipped floating objects is usually very limited because of the height of the antenna on the floating object is usually very low, often just a few inches above the water level; and also because the height of the ship's antenna is also usually relatively low, as compared with aircraft antennas. In addition, the line of sight between the ship's antenna and the antenna on the object is often restricted by ocean waves and wave action.

In general, reliable signal reception of a ship operating under the usual conditions outlined in the preceding paragraph seldom exceeds ranges of the order of about fifteen miles. When aircraft are used, ranges up to about eighty miles are usual, even with low power beacon transmitters. As noted above, an object of the present invention is to provide a simple and inexpensive system which does not require aircraft, and yet which gives ranges up to and exceeding those realized when aircraft are used.

As noted above, the system of the invention provides a means, not only of specifically locating a floating object, as opposed to mere direction finding on it, but also of extending the effective search range of a surface ship, for example, to approximately 150 miles without the need for assisting aircraft.

As illustrated, for example, in FIGURES 1 and 2, the system of the invention in one of its embodiments includes a parachute 10. As mentioned above, the parachute may be replaced by a self-inflating balloon which could be used to maintain the airborne components at an approximately constant azimuth and elevation with respect to the position of the beacon equipped floating object. Alternatively, as will be hereinafter explained, when it is desired that the system be utilized for a relatively short period of time, other appropriate vehicles may be utilized which allow the airborne components of the system to descend and rotate at a predetermined rate. The parachute 10 has a mylar canopy 12, for example, which is metallized, or otherwise treated, to be radar reflective. A plurality of vents 14 are provided near the skirt of the canopy 12, and these vents are disposed at equiangular positions around the periphery of the canopy. The vents 14 form jets which cause the parachute 10, and the equipment suspended therefrom, to rotate as the parachute descends. The parachute 10 may be a relatively large drag area parachute whose rate of descent, for example, is such that a full 1¾ hours of search time may be provided as the parachute descends, for example, from 60,000 feet to 25,000 feet.

The parachute 10 supports a radio receiver/transmitter unit 16 of any appropriate design. The unit 16 includes a usual omni-directional transmitting antenna 18, and it includes a highly directional receiving antenna 20. The directional receiving antenna 20 is provided for the reception of beacon signals, as will be explained, and this antenna is caused to scan a continuous azimuth circular pattern as the parachute descends. Signals received by the directional receiving antenna 20 are repeated through the transmitter portion of the unit 16 and radiated by the omni-directional antenna 18 to the searching ship. During the azimuth scan, an identifying pulse may be transmitted to the ship each time the receiving antenna 20 crosses the magnetic north axis, this being provided by a magnetic compass.

The unit 16 and its associated antennas 18 and 20 can take any appropriate form known to the art, and a detailed explanation of these instrumentalities is believed to be unnecessary herein.

As shown in FIGURE 1, the parachute 10 and its associated components are launched, for example, by a rocket vehicle from a ship or vessel 22 to its working altitude of, for example, 60,000 feet. The parachute 10 is contained in an appropriate vehicle 24 which may be similar to the vehicle described and claimed in copending application Serial No. 116,545, filed June 12, 1961, now Patent No. 3,104,612, and assigned to the assignee of the subject application.

As described in more detail in the copending application, the vehicle 24 forms a housing for the parachute 10, the parachute being contained in a deployment bag in the vehicle. The vehicle 24 may be contained in a rocket booster which is launched from the ship 22 and, in accordance with known practice, the rocket booster carries the vehicle to its working altitude. When the working altitude is reached, the vehicle 24 is separated from the rocket booster. Upon this separation, a release mechanism in the vehicle 24 is set into operation. This release mechanism, after a predetermined time interval and in a manner fully described in the aforementioned copending application, causes the parachute 10 and its associated components to be deployed.

The parachute 10, after being deployed from the vehicle 24, becomes inflated. The inflated state of the parachute 10 is illustrated in FIGURE 2. The parachute 10, and the unit 16 and associated components suspended from the parachute, then begin their slow descent. During the actual object locating operation, the parachute 10 may descend, for example, from a height of 60,000 feet to a height of 15,000 feet in 1¾ hours, as noted above. As also described, the parachute assembly is launched from a surface ship by means of a rocket booster vehicle. However, if so desired, the assembly may be launched from an aircraft, and then no such rocket booster vehicle is required. No special guidance equipment is needed in the launching because high accuracy is not necessary.

In the illustrated embodiment of the invention, it is assumed that the object or airman to be located is to be retrieved from a large body of water, and that the searching surface craft is a ship. It is evident, of course, that the object to be located may be returned to land, and the system of the invention be operated by an appropriate land vehicle.

In the illustrated embodiment, the nose cone or capsule, or other object 26 to be located, is illustrated as floating in the water. The object 26 is equipped with a beacon transmitter 28 which radiates signals from an antenna 30. These signals, in accordance with usual beacon practice, have a predetermined frequency, and they are transmitted in a particular identifying code sequence. The signals from the beacon transmitter 28 in the object 26 are intercepted by the directional receiving antenna 20 of the receiver/transmitter unit 16 suspended from the parachute 10, and the intercepted signals are fed to the receiver portion of the unit 16. The beacon signals from the transmitter 28 are intercepted in this manner each time the rotating parachute assembly has a particular orientation with respect to the object 26.

The vessel 22 is equipped with a radio receiver (not shown) which is coupled to an antenna 32. The vessel also includes a transmitter (not shown) which also may be coupled to the antenna 32. The transmitter in the vessel 22 radiates signals to the receiver portion of the unit 16 suspended from the parachute 10. These latter signals are received by the receiver portion of the unit 16 only when the parachute 10 has an orientation in each scanning cycle such that the directional receiving antenna 20 is pointed towards the vessel 22. The signals received by the receiver portion of the unit 16 are immediately returned to the vessel 22 by the transmitter portion of the unit 16 where they are received by the receiver in the vessel. These latter signals have the same frequency as the signals from the beacon transmitter 28 so that they may be received by the receiver portion of the unit 16. However, the signals from the transmitter in the vessel 22 may be provided with a different code, so that they may be distinguished from the signals transmitted by the beacon transmitter 28 in the object 26.

The vessel 22 is also equipped with a usual ship's radar system (not shown) which is coupled to a usual radar antenna 34. The radar antenna 34 directs radar signals to the radar-reflective canopy 12 of the parachute 10. The ship's radar system operates in known manner to provide continuous range, elevation and azimuth information of the parachute 10 with respect to the vessel 22.

The vehicle 24 may be launched, for example, when the vessel 22 is within a working distance of approximately 100 miles from the object 26. The working altitude of the parachute 10, for example, as mentioned above, may be from 60,000 to 15,000 feet.

Figure 3B:
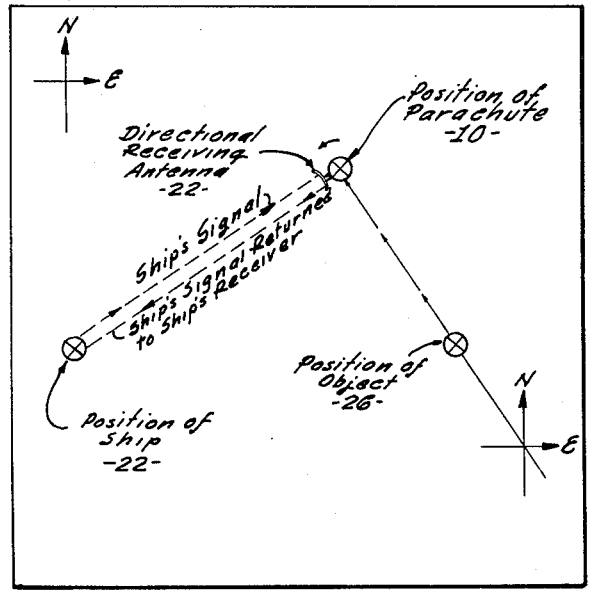

In operating the system in the manner illustrated pictorially in FIGURE 2, the actual position of the vessel 22 is first located by usual navigational techniques, and this position is plotted on the plotting board, as shown, for example, in FIGURES 3A, 3B and in FIGURE 5. The above procedure is, of course, in accordance with usual navigational practice. Then, through the use of the ship's radar system, the actual position of the parachute 10 is determined, and this latter position is also plotted on the plotting board, as also shown in the schematic representations of FIGURES 3A, 3B and FIGURE 5. The actual positions of the parachute 10 and of the vessel 22 are then maintained as a function of time on the plotting board, throughout the search for the object 26.

The vents 14 in the parachute canopy, as noted above, cause the parachute 10 to rotate as it descends. This rotation of the parachute causes the transmitter/receiver unit 16 and the associated antennas 18 and 20 to rotate.

In a typical system, for example, an azimuth scan of about one revolution in five seconds is maintained.

As noted, during the above-mentioned azimuth scan, the directional antenna 20 receives signals from the beacon transmitter 28 in the object 26 only when the parachute assembly causes the antenna 20 to point in the direction of the object 26. This instantaneous condition is illustrated, for example, in the schematic representation of FIGURE 3A. For the particular orientation illustrated in FIGURE 3A of the parachute assembly during each scanning cycle, the receiver portion of the transmitter/receiver unit 16 receives signals from the beacon transmitter 28 in the object 26, and these signals are relayed to the receiver in the vessel by the transmitter portion of the unit 16.

As each cycle of the azimuth scan of the directional receiving antenna 20 on the parachute is continued, the directional antenna 20 will subsequently point towards the vessel 22, as shown by the schematic representation of FIGURE 3B. The signal from the ship's transmitter will then be intercepted by the antenna 22 and received by the receiver portion of the receiver/transmitter unit 16. Upon the receipt of the signal from the ship's transmitter by the receiver portion of the unit 16, the signal is immediately relayed back to the ship's receiver, as illustrated in the schematic diagram of FIGURE 3B. The successive reception of these latter signals by the ship's receiver serves to establish the exact scanning cycle rate of the parachute 10. In addition, since the direction from the ship to the parachute is known, the time of receipt of these latter signals during each successive scanning cycle of the parachute, serves to fix the absolute scan angle direction as a function of time.

For example, the receiver in the vessel 22 may be coupled to a usual cathode-ray oscilloscope having a display screen as shown schematically in FIGURE 4. The oscilloscope is controlled in usual manner to have a circular sweep which is synchronized with the rotation of the parachute 10. The circuitry and synchronizing techniques for the oscilloscope are extremely well known and in common use, and for that reason the actual circuitry and controls will not be described in detail herein.

The circular trace on the screen of the oscilloscope is illuminated at one angular position by the series of signals received from the transmitter portion of the unit 16 in the parachute corresponding to the signals received by the receiver portion of the unit 16 from the ship's transmitter and returned to the ship by the antenna portion of the unit 16 for reception by the ship's receiver. This first series of signals is illustrated as producing an illumination A on the circular trace on the screen of the oscilloscope.

The second series of signals received from the beacon transmitter in the object to be located and repeated by the unit 16 to the ship's receiver produce a second illumination B on the circular trace on the screen of the oscilloscope which is angularly displaced from the illumination A.

The circular trace of the cathode-ray oscilloscope can be controlled to be synchronized with the azimuth scan of the directional receiving antenna on the parachute 10, as mentioned above, and such synchronism is indicated when the illumination A assumes a stationary position on the display screen.

The display screen of FIGURE 4 may be calibrated as a compass card, as illustrated, and these calibrations may be inscribed on an annular member which is mounted for relative rotation with respect to the display screen. The signals indicative of magnetic north received from the parachute equipment produce an illumination C on the circular trace of the oscilloscope screen in FIGURE 4. The annular member may then be rotated until the illumination C is radially aligned with the "north" calibration on the annular member.

Alternately, because the actual direction between the ship and the parachute is known by the ship's radar, the annular member may be rotated until the illumination A assumes its known direction with respect to the calibrations on the annular member. This renders the "north" identifying signals and illumination C unnecessary. In either event, when this adjustment is made, the angular position of the illumination B with respect to the calibrations on the adjusted annular member represents the actual azimuth of the object 26 with respect to the parachute 10.

Therefore, the azimuth of the object 26 with respect to the parachute 10 can be plotted, as shown in FIGURE 5. After a particular time interval, the parachute will have drifted, so that a second reading can be made. The resulting azimuth line derived from the second reading is also plotted, as shown in FIGURE 5. The intersection of these two lines, therefore, represents the actual position of the object to be located.

The actual fixing of the position of the object 26 in the procedure described above depends upon some drift in the position of the parachute 10. In the general case, it is reasonable to assume that the parachute will drift significantly in position due to the wind. This is especially a reasonable assumption for usual searches which normally require a period of approximately 1¾ hours. In the unlikely event that a dead calm exists, a second parachute 10 may be launched for actual location fixing. In such a case, the positions A and B shown in FIGURE 5 would represent the positions of the two different parachutes and associated equipment.

It is evident, of course, that many fixes may be made during the search for the object, with the vessel 22 steaming towards the indicated position of the object. As the vessel proceeds toward the object, other fixes may be made to improve the accuracy of the object location. In each instance, the ship's course will be steered to the point indicated by the latest fix.

The invention provides, therefore, an improved system which is extremely simple in its concept and operation, and yet which permits accurate fixes to be made on the actual location of an object to be recovered.

What is claimed is:

1. A system for locating the position of an object having a beacon transmitter contained therein which is adapted to radiate a radio signal, said system including: first radio transmitting and receiving means, a unit adapted to be airborne and including further radio transmitting and receiving means, a directional receiving antenna mounted on said unit and coupled to the further radio receiving means, an omni-directional transmitting antenna positioned on said unit and coupled to the further radio transmitting means, and means for causing the directional antenna on said unit cyclically to perform a scan to successively intercept signals from the beacon transmitter in the object and from the said first radio transmitting means at respective angular positions of the directional receiving antenna on said unit during each scanning cycle and to introduce such signals to said further radio receiving means in said unit, said further transmitting means in said unit serving to successively re-transmit over said omni-directional transmitting antenna to said first receiving means the signals introduced to said further receiving means.

2. A system for locating the position of an object having a beacon transmitter contained therein which is adapted to radiate a radio signal, said system including: radar means and first radio transmitting and receiving means mounted on a search vehicle, a unit including a radar reflective surface adapted to be airborne and to be detected by said radar means, further transmitting and receiving means mounted on said unit, a directional radio receiving antenna mounted on said unit and coupled to said further radio receiving means, an omni-directional transmitting antenna mounted on said unit and coupled to said further radio transmitting means, and means for causing said directional receiving antenna cyclically to perform an azimuth scan to successively intercept the signal from said radio beacon in the object and a signal from said first radio transmitting means at respective angular positions on said directional radio receiving antenna during each scanning cycle and to introduce such signals to said further radio receiving means in said unit, said further radio transmitting means in said unit serving to successively re-transmit to said first radio receiving means included in said search vehicle the signals introduced to said further radio receiving means.

3. The combination defined in claim 2 and in which said radar means serves to establish the range and azimuth of said unit with respect to the search vehicle.

4. The combination defined in claim 2 and in which said unit comprises a parachute including a metallized canopy to form said radar reflective surface.

5. A system for locating the position of an object having a beacon transmitter contained therein which is adapted to radiate a radio signal, said system including: radar means and first radio transmitting and receiving means mounted on a search vehicle, a parachute including a canopy having a metallized surface to be radar reflective, means for causing said parachute to be airborne, said radar means being adapted to establish the azimuth and range of said parachute with respect to the search vehicle, further transmitting and receiving means mounted on said parachute, a directional receiving antenna mounted on said parachute and coupled to said further radio receiving means, an omni-directional transmitting antenna mounted on said parachute and coupled to said further radio transmitting means, means for causing said parachute to rotate to cause the directional receiving antenna cyclically to perform an azimuth scan so as to successively intercept the signal from said beacon transmitter in the object and the signal from said first radio transmitting means at respective angular poistions of said directional radio receiving antenna during each scanning cycle and to introduce such signals to said further radio receiving means on said parachute, said further radio transmitting means on said parachute serving to successively re-transmit to said first radio receiving means included in the search vehicle the signals introduced to said further radio receiving means.

6. The combination defined in claim 5 and which includes a plurality of vents mounted on the canopy of said parachute to produce the aforesaid rotation of said parachute during the descent thereof.

7. The combination defined in claim 5 wherein the means for causing said parachute to be airborne is mounted on the search vehicle.

8. A position locating system comprising:
first and second receiver and radiating transmitter combinations;
a signal radiating beacon transmitter remote from the first and second receiver and transmitter combinations;
means propelling the first transmitter and receiver combination aloft to a position within communicable range of both the second transmitter and receiver combination and the remote beacon transmitter;
omni-directional transmitting and directional receiving electro-magnetical radiators associated respectively with the first transmitter and receiver combination;
means cyclically rotating the directional antenna at a given rate to successively intersect the beacon transmitter signal and the second transmitter signal at respective angular positions of the directional antenna;
means introducing each received signal into the receiver of the first transmitter and receiver combination; and
means re-transmitting each successive received signal to the receiver of the second transmitter and receiver by means of the transmitter of the first transmitter and receiver combination and its associated omni-directional radiator.

9. The position locating system of claim 8 further comprising means for maintaining the first transmitter and receiver combination at an approximately constant azimuth and elevation with respect to the position of the remote beacon transmitter.

10. The position locating system of claim 8 wherein the first transmitter and receiver combination descends at a relatively slow rate.

No references cited.